350-382 SR SEARCH ROOM
OR 3,375,052
X 4021Y

March 26, 1968 K. M. KOSANKE ET AL 3,375,052

LIGHT BEAM ORIENTING APPARATUS

Filed June 5, 1963 2 Sheets-Sheet 1

INVENTORS
KURT M. KOSANKE
WERNER W. KULCKE

BY John F. Ophterndorf

ATTORNEY

March 26, 1968 K. M. KOSANKE ET AL 3,375,052

LIGHT BEAM ORIENTING APPARATUS

Filed June 5, 1963 2 Sheets-Sheet 2

United States Patent Office 3,375,052
Patented Mar. 26, 1968

3,375,052

LIGHT BEAM ORIENTING APPARATUS

Kurt M. Kosanke and Werner W. Kulcke, Wappingers Falls, N.Y., assignors to International Business Machines Corporation, New York, N.Y., a corporation of New York Filed June 5, 1963, Ser. No. 285,833
8 Claims. (Cl. 350—150)

This invention relates to apparatus for altering light beams and, more particularly, to electro-optical apparatus for effecting controlled alterations and orientations in the directional path of light beams.

In the development of modern day computing and data processing systems, operating speeds and storage capabilities have steadily increased. However, the development of input/output and display devices for handling the information processed by the computers has not kept pace. This factor is particularly true in devices for handling graphic and analog type information.

Consequently, in the computer art, the need exists for analog type input/output devices operable according to electro-optical principles, to alter and orient the direction of light beams. Heretofore, light beams have been altered by arranging an electro-optical active crystal set between crossed polarizers in a vacuum chamber. Electric charges are deposited on the surface of this crystal by means of a cathode ray beam. A collimated light beam illuminating the entire surface of the crystal is allowed to pass through the system only at those areas charged by the beam. By changing the position of these areas, the locus of the transmitting area can be changed. Arrangements such as this require that the entire crystal area be illuminated in order to effect transmission at a particular point. They have a high light loss and, therefore, have only limited use in computing systems. Other apparatus provides for a change in the index of refraction of a prism by applying voltages to effect an alteration in the path of a light beam. This type of equipment accomplishes only a minor change of direction even if very high voltages are applied and even though a number of prisms are series connected.

Accordingly, it is a general object of the invention to provide improved electro-optical apparatus capable of being utilized as input/output and display devices for handling graphic and analog type information.

It is another object of the invention to effect alterations in the directional path of a light beam.

It is another object of the invention to effect controlled orientations in the path of a light beam in accordance with an externally applied excitation.

Another object of the invention is to accomplish the rotation of a light beam in response to a predetermined electrical excitation.

A further object of the invention is to change electro-optically the direction of a light beam to effect a deviation or splitting thereof.

Briefly, the foregoing objects are accomplished by providing electro-optical apparatus capable of accepting an incident linear polarized light beam to provide a beam altered or deviated in direction from the incident beam. The apparatus comprises means including electrically energizable means for rotating the beam a predetermined extent. According to one feature of the invention the electrically energizable means is of crystalline structure oriented to receive the incident beam along its optic axis. Provision is made for applying a potential difference across the structure, so that dependent on the particular crystalline structure and the voltage applied across it, the incident beam is emitted by the structure as a particular type of polarized light, i.e., linear, elliptical or circular. Means are also provided for accepting the particular type of light to transform it back to linear polarized light but rotated with respect to the incident beam an extent determined by the type of light emitted by the crystalline structure.

Another feature of the invention provides for the use of means of prismatic form to effect the splitting of the rotated linear polarized light beam into a plurality of split beams having respective directions dependent on the potential difference across the crystalline structure.

A further feature of the invention provides for the use of means including means for causing conical refraction of the rotated linear polarized light to provide a beam of polarized light deviated a controlled amount from the incident beam.

The foregoing and other objects, features and advantages of the invention will be apparent from the following more particular description of the preferred embodiments of the invention, as illustrated in the drawings, wherein.

Figure 1:
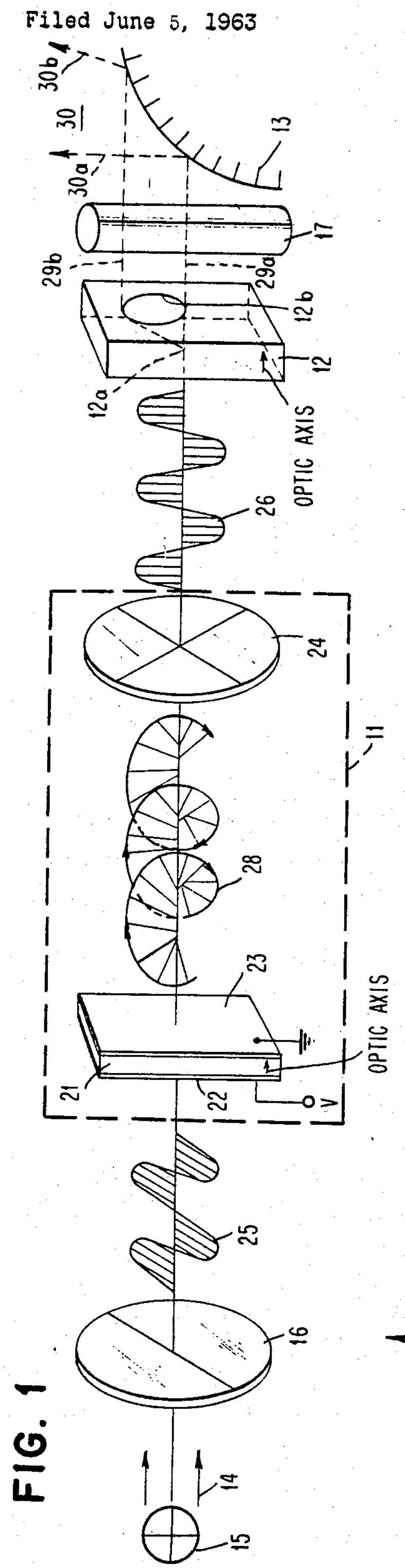
FIGURE 1 is a schematic perspective view of electro-optical apparatus embodying the principles of the invention.

Referring now to FIGURE 1, the apparatus, embodying the principles of the invention for accomplishing an alteration or deviation of the path of travel of a collimated beam of light 14 provided by a source 15 from an incident course, includes a rotator 11, a birefringent crystal 12, a mirror 13 and a polarizer 16.

Rotator 11 comprises an electro-optical device 21 of crystalline structure arranged to have its optic axis parallel to the axis of the incident light beam. Device 21 has transparent or semi-transparent electrodes 22 and 23 affixed to its surfaces in the path of the beam so that a difference of a potential V may be applied between the electrodes. The rotator 11 also comprises a quarter-wave plate 24 oriented to provide a 90° retardation of the light emitted by the device 21.

The device 21 may be uniaxial in nature having the characteristic of acting as a normal glass plate in the absence of an applied potential. However, when voltage is applied across the device, it becomes biaxial enabling a light beam directed along its optic axis to split into two directions determined by the refractive indices of the crystalline structure. Dependent on the particular crystalline structure and the value of voltage, the device 21 emits a particular type of polarized light, i.e., linear, elliptical or circular.

A device having these characteristics may be formed of potassium dihydrogen phosphate having the chemical composition $KH_2PO_4$ and referred to as a KDP crystal. A KDP crystal has a half wavelength voltage of approximately 7.5 kv. at a wavelength of approximately 5461 Angstrom units. Throughout the balance of the description of the apparatus, it will be assumed that a KDP crystal is employed. However, other materials which may be employed for the electro-optical active crystal are ammonium dihydrogen phosphate ($NH_4H_2PO_4$) and potassium deuterium phosphate ($KD_2PO_4$). These compositions have half wavelength voltages of approximately 9.6 kv. and 3.4 kv., respectively. Although electro-optical crystalline structures have been described for accomplishing the rotation of the polarization plane of the light beam, other useful devices for accomplishing the same purpose include Kerr cells, magneto-optical means and strain or stress optical structures.

In the operation of FIGURE 1, a collimated light beam 14 from source 15 is directed at polarizer 16 to provide the linear polarized light beam at 25. The orientation of polarizer 16 controls the polarization direction of the beam 25. Thus, to facilitate the description of the invention, polarizer 16 has been positioned to provide the beam 25 with a polarization displaced 45° from the vertical axis of the polarizer.

Beam 25 is directed at the rotator 11 and is emitted as linear polarized light beam 26. This beam is shown as being vertically polarized and parallel to the vertical axis of polarizer 16. The angle of displacement of beam 26 with respect to the incident beam 25 is dependent on the rotator 11. As stated above, the operation of the rotator 11 depends, in turn, on the crystalline structure employed as device 21 and the potential difference V applied across it.

Figure 2:
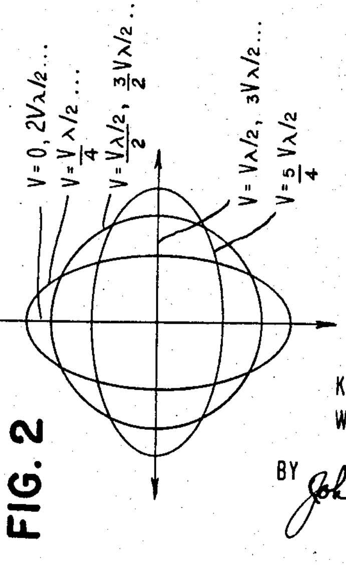
FIGURE 2 is a schematic diagram illustrative of the types of polarized light that may occur in the apparatus of FIGURE 1.

Incident polarized beam 25 is polarized at 28 to a particular type of polarization by device 21 (for example, circular polarization), retarded 90° by quarter-wave plate 24 and emitted at 26. The type of polarization depends on the potential difference applied across device 21. Thus, as shown in FIGURE 2, if no voltage is applied, the incident linear polarized light beam 25 is emitted by device 21 with the same form. If a voltage equivalent to the half wavelength voltage is applied (for a KDP crystal, $V_{\lambda/2}=7.5$ kv.), the light beam 25 is displaced 90° in a horizontal direction by the device 21. If any other value of voltage other than an odd or even full multiple of the half wavelength voltage is applied to the crystal, a form of elliptical polarized light is emitted by the device 21. The apogee and perigee of the ellipse and the displacement of them about the vertical and horizontal axes is determined by the value of voltage. For the particular case where the potential difference V across device 21 is $$\frac{V_{\lambda/2}}{2}, \frac{3}{2}V_{\lambda/2} \cdots$$

the device 21 emits circular polarized light.

Figure 3:
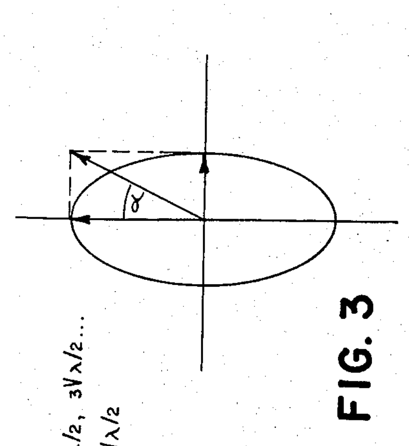
FIGURE 3 is a schematic diagram illustrating the effect of a quarter-wave plate in rotating a light beam in the apparatus of FIGURE 1.

The light beam, for example the circular polarized light beam 28 emitted by the device 21, is applied to quarter-wave plate 24. This plate is oriented to retard the circular polarized light beam 28 to produce the linear polarized light beam 26 which is rotated with respect to the incident beam 25. The angle of rotation (angle $\alpha$ as shown in FIGURE 3) for this illustration is equivalent to 45°. In general, angle $\alpha=\pi/2.\ V/V_{\lambda/2}$ where V is the potential difference applied across the device 21 and $V_{\lambda/2}$ is the half wavelength voltage of the crystalline structure of the device 21.

Rotator 11, therefore, accepts a linear polarized beam and rotates the angle of polarization with respect to the original beam an extent dependent on the voltage applied across the device 21 and the material employed in it. It will be more apparent from the description which follows hereinafter that the rotational displacement of this light beam is related to the final displacement or deviation of the apparatus output light beam from its original course.

Referring again to FIGURE 1, the linear polarized light beam 26 emitted by the quarter-wave plate 24 is directed at the birefringent crystal 12. The crystal may be formed of a material, such as naphthalene having a cone angle equal to 13° 42′. Other materials which may be employed are anthracene having a cone angle of 18° 30′ or aragonite having a cone angle of 1° 48′.

Under ordinary circumstances, if a beam of polarized light strikes a birefringent crystal, the light beam breaks down into an ordinary ray and an extraordinary ray These rays propagate through the crystal in different directions and with different velocities. If the light beam strikes the crystal along the optic axis of the crystal, for example at the point 12*a* on crystal 12, internal conical refraction of the beam takes place. Not only does the breakdown phenomena take place into an ordinary ray and extraordinary ray, but also an infinite number of possible light propagation directions occur to form a cone in the crystal. The circle of the cone is indicated at 12*b* on the face of the crystal 12.

Figure 5:
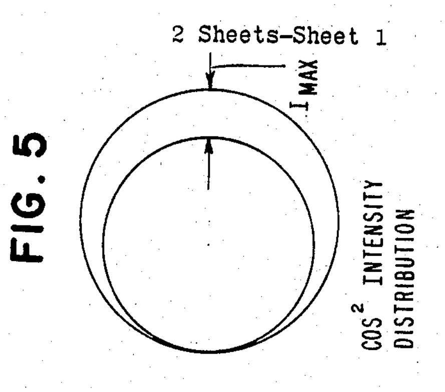
FIGURE 5 is a schematic diagram illustrative of the $\cos^2$ distribution of the light intensity at the output circle of the conically refracted light for light polarized at 45°.
Figure 4:
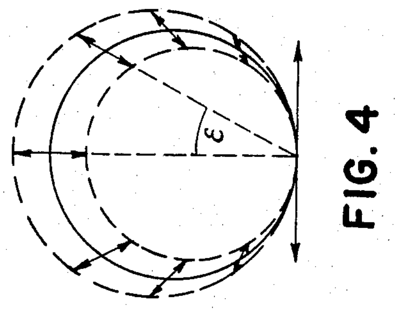
FIGURE 4 is a schematic diagram illustrating a polarized light beam conically refracted according to a $\cos^2$ distribution of the light intensity.

As shown in FIGURE 4, the polarized light beam 26 does not leave the crystal 12 at a certain point according to the direction of polarization of the incident beam, but rather on the whole cone circle 12*b* with an intensity distribution of $I=I_{max} \cos^2 \epsilon$, where $\epsilon$ is the angle relative to the direction of the maximum intensity measured at the point of minimum intensity. Thus, the intensity distribution at the cone circle has a locus of maximum light intensity. The greatest intensity is at a particular point between the rays indicated at 29*a* and 29*b*. In FIGURE 5, the light intensity at the output circle 12*b* of the conically refracted light that is polarized 45° is illustrated for a $\cos^2$ intensity distribution.

To provide a light beam at 30 having a direction with a predetermined deviation or orientation between 30*a* and 30*b* for use in some form of read-out apparatus, the distributed intensity beam emitted by crystal 12 is deflected by the curved mirror 13. The cylindrical lens 17 is included to focus and reduce the circle 12*b* and to improve the beam resolution. The point of maximum light intensity between 29*a* and 29*b* determines the particular angle of the output light beam 30 reflected by mirror 13. Thus, this angle is determined by the extent that the polarized light beam 25 is rotated from its initial position by the rotator 11. As previously stated, beam rotation is dependent on the potential difference across device 21 and its particular crystalline structure.

Figure 6:
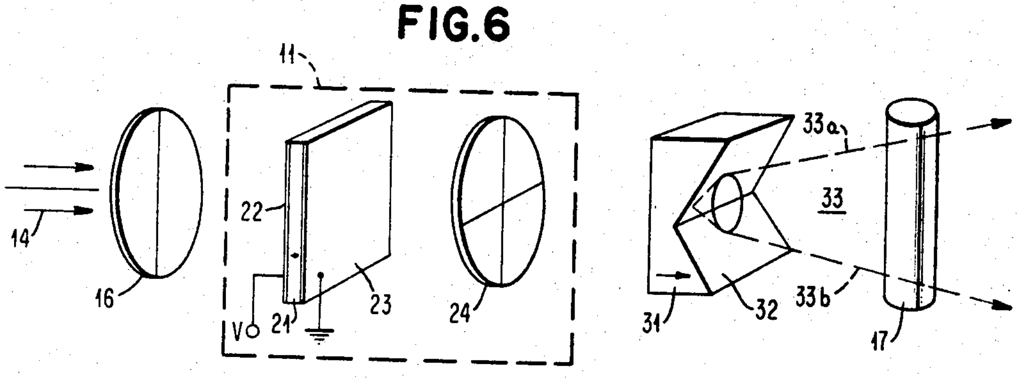
FIGURE 6 is a schematic perspective view of a modified form of electro-optical apparatus embodying the principles of the invention.

In FIGURE 6, another form of apparatus embodying the principles of the invention provides for the elimination of the mirror structure utilized in the arrangement of FIGURE 1. The crystal 12 of FIGURE 1 is replaced by a crystal 31 having a prismatic shape along its rear face 32. Crystal 31 achieves the same internal conical refraction and the same intensity distribution that is accomplished by the crystal 12 of FIGURE 1 and, in addition, it serves to alter and deflect the output light beam 33 in a particular orientation or direction between the rays indicated at 33*a* and 33*b*. The cylindrical lens 17 again focuses and reduces the light at the cone circle 34 to render the beam 33 useful in some form of read-out apparatus.

Figure 7:
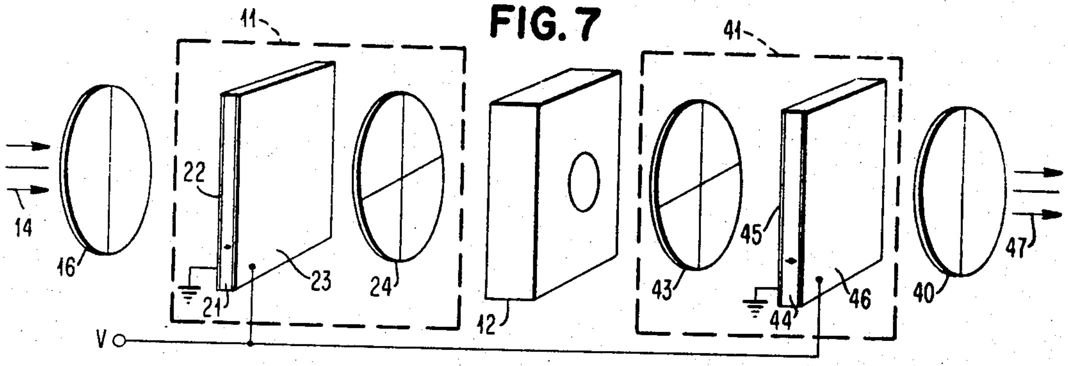
FIGURE 7 is a schematic perspective view of a second modified form of electro-optical apparatus embodying the principles of the invention.

The arrangements of FIGURES 1 and 6 provide a $\cos^2$ intensity distribution of the conically refracted light at the crystals 12 and 31, respectively. Such a distribution lacks resolution particularly where it is desired to have the beam leave the crystal at a particular point. To improve the beam resolution, the intensity distribution is improved to a $\cos^4$ distribution. This is accomplished by employing an additional polarizer or analyzer in the apparatus. However, if an analyzer is arranged to accept linear polarized light in a vertical direction any other light will not be accepted by the analyzer. To assure that the light striking the analyzer 40 is accepted (refer to FIGURE 7) an additional rotator 41 is included between the analyzer 40 and the crystal 12. The components of rotator 41 are reversed in position, so that the light emitted by crystal 12 is directed at a quarter-wave plate 43.

Quarter-wave plate 43 and a second electro-optical active device 44 having transparent or semitransparent electrodes 45 and 46 effect a rotation of the maximum intensity emitted by the crystal 12. The rotation that is accomplished is equivalent to the same rotation that is imparted by the rotator 11 in response to the incident light beam from the polarizer 16.

For example, if the light incident on device 21 of rotator 11 is linear polarized, then no voltage V is applied across this device and the linear polarized light is passed through the quarter-wave plate 24 in the same form to crystal 12. Similarly, the maximum intensity light beam emitted by crystal 12 is vertically linear polarized, and then the quarter-wave plate 43 passes this light to the device 44 which does not alter its position of maximum intensity and it provides vertically linear polarized light to the analyzer 40. If the incident light on the crystal 12 is horizontally polarized, then the same action takes place except that the voltage V applied across the two devices 21 and 44 is equivalent to the half wavelength voltage of the material of the crystalline structures to effect a 90° rotation by each of the devices 21 and 44.

In a third case, if the light provided to the crystal 12 is polarized 45° with respect to the horizontal and vertical axes, then as previously described, the device 21 has provided circular polarized light to quarter-wave plate 24. The quarter-wave plate 24 has retarded this polarized light and has provided linear polarized light that has been retarded 45°. Therefore, the crystal 12 provides light having its maximum intensity at a 45° angle with respect to the vertical and horizontal axes, and the quarter-wave plate 43 provides circular polarized light which is incident on the device 44. The device 44 is energized at the same potential as the device 21 causing the light emitted by this device and directed at analyzer 40 to be vertically linear polarized light. Device 44, therefore, always provides for the vertical rotation of the light striking it permitting it to be accepted by the vertically oriented analyzer 40. The amount of rotation is determined by the voltage applied across the device. Beam 47 emitted by analyzer 40 has a $\cos^4$ intensity distribution and may be deflected in its path by a mirror structure of the type described for FIGURE 1.

Figure 8:
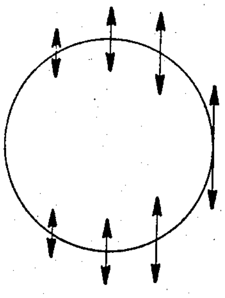
FIGURE 8 is a schematic diagram illustrative of a polarized light beam conically refracted according to a $\cos^4$ distribution by the apparatus of FIGURE 7.
Figure 9:
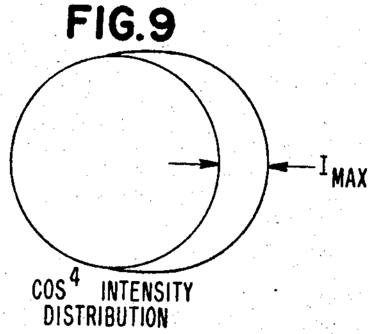
FIGURE 9 is a schematic diagram illustrative of the $\cos^4$ distribution of the light intensity at the output circle of the conical refractor for light polarized 45° as in the apparatus of FIGURE 7.

As shown in FIGURE 8, the distribution of the polarization of a light beam polarized 45° is greatest in the vertical direction. A $\cos^4$ intensity distribution for a light beam with 45° polarization is illustrated in FIGURE 9. It is obvious that the intensity distribution for the illustration of FIGURE 9 is greater at the line of maximum intensity and less for all other points than in the illustration of FIGURE 5.

Figure 10:
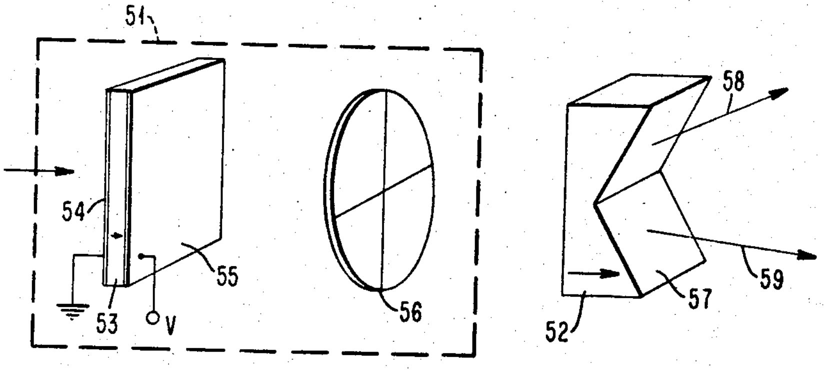
FIGURE 10 is a schematic perspective view of electro-optical apparatus according to the invention for accomplishing beam splitting.

Referring now to FIGURE 10, a rotator 51 is employed with a crystal 52 to effect beam splitting. The rotator 51 comprises an electro-optical active device 53 having electrodes 54 and 55 affixed to it so that a difference of potential V may be applied across the device. It also includes a quarter-wave plate 56. If a beam of linear polarized light is directed at device 53, it is emitted with a linear, elliptical or circular polarized type or form as previously described, dependent on the material of the crystal and the voltage V applied across it.

The quarter-wave plate 56 used in conjunction with the device 53 transforms the polarized light beam back to linear form but rotated from the direction of the incident beam an extent dependent on voltage V. If this beam of light is directed at crystal 52 along its optic axis, the crystal undergoes internal conical refraction, if the crystal is birefringent. As previously stated, the beam travels in the crystal along the surface of a cone with the position on the cone surface depending on the direction of polarization of the light beam incident on it. If the rear face 57 of the crystal 52 is shaped prismatically, as shown in FIGURE 10, refraction occurs in two different directions which depend on the voltage V. By applying a very small high frequency voltage across device 53, the beam emitted by crystal 52 can be switched between 58 and 59 to obtain two-directional beam splitting. If more than two splitting directions are required, the rear face of this crystal should be shaped with plural faces such as that of a polygon. In such an instance, the emitted beam of light would switch from one face to another and thus from one direction to another by altering the voltage applied across crystal 52.

If the crystal 52 employed in the arrangement of FIGURE 10 is uniaxial in nature rather than biaxial as described, the beam is split into two rays, an ordinary ray and an extraordinary ray. The intensity of each of these rays is dependent on the direction of polarization of the incoming light and therefore on the voltage applied across the device 53. The direction of splitting of the light beam also depends on the refraction angle of the prism formed by the shape of the rear face 57 of the uniaxial crystal.

While the invention has been particularly shown and described with reference to the embodiments thereof, it will be understood by those skilled in the art that the foregoing and other changes in form and details may be made therein without departing from the spirit and scope of the invention. For example, the light beam employed in the apparatus has been described as being of a collimated nature. It should be understood that the invention is not so limited, but may include the use of converging rays having appropriate focusing means included in the apparatus.

What is claimed is:

1. In optically aligned combination, means for accepting a beam of plane polarized light, means coupled to said accepting means for applying a force thereacross so that said accepting means provides a light beam with a polarization type dependent on the amount of force applied across it, means for restoring the light beam to a plane polarized beam with an angle of polarization dependent on the polarization type of the light beam output emitted by the accepting means, and birefringent optical means having its optic axis in alignment with the optic axis of the combination in the path of the output light beam for effecting conical refraction of the restored light beam to provide an output beam with an intensity distribution following a cosine function as determined by the polarization type of the beam emitted by the accepting means.

2. The combination of claim 1, wherein said optical means is shaped prismatically.

3. The combination of claim 1, wherein said optical means has plural prismatic faces for effecting a deviation of the restored beam in plural directions, the respective directions being dependent on the amount of force applied across said accepting means.

4. The combination of claim 1, wherein said optical means is characterized by being uniaxial to provide an output light beam with an ordinary ray and an extraordinary ray in response to the restored light beam (emitted by the crystalline structure means), the direction of particular rays being determined by the refraction angle of the optical means and the force applied across the accepting means.

5. Apparatus for effecting conical refraction of a light beam, comprising a polarizer for accepting a collimated beam of light to provide a linear polarized light beam, electro-optical means of crystalline structure oriented to accept the polarized light beam along an axis parallel to its optic axis and having a difference of potential thereacross to produce an output beam of polarized light having a type dependent on the potential difference, means for restoring the output light beam from the electro-optical means to provide a linear polarized light beam rotated from its original direction an extent determined by the voltage applied across the electro-optical means and the crystalline structure of this means, and birefringent optical means having its optic axis in alignment with the optic axis of the electro-optical means for conically refracting the restored light beam into an infinite number of possible light propagation directions.

6. Apparatus arranged along a common optic axis for deviating the direction of an input beam of linear polarized light, comprising means for effecting a rotation of the plane of polarization of the input beam of linear polarized light, and means having its optic axis oriented parallel to the common axis and responsive to the rotated polarized light beam for producing a conically refracted light beam with an intensity distribution following a cosine function and a direction deviated from the direction of the input beam as determined by the extent of rotation of the plane of polarization of the input beam.

7. The apparatus of claim 6, and further comprising means for rotating the polarization of the conically refracted light beam to provide a well-defined output light beam, the means for effecting the rotation of the polarization plane of the conically refracted beam comprising, means for restoring the conically refracted light beam to a linear polarized type having a plane of polarization dependent on the type of the conically refracted light beam, and means for accepting this latter restored beam to provide a polarized light output beam having a particular form of polarization.

8. Apparatus for altering the direction of a light beam, comprising electro-optical means for receiving a beam of linear polarized light along an axis parallel to its optic axis, said electro-optical means being of crystalline structure and having provision for applying a difference of potential thereacross so that the type of polarized light beam emitted from the electro-optical means depends on the magnitude of the potential difference applied across the electro-optical means, means for restoring the polarized light beam emitted from the electro-optical means to a linear polarized light beam having a direction dependent on the type of polarized light beam emitted by the electro-optical means, birefringent means having its optic axis in alignment with the optic axis of the electro-optical means for effecting conical refraction of the restored linear polarized light beam to produce the deviated light beam whose deviation from the direction of the incident beam is dependent on the conical refraction produced, and means having its optic axis in alignment with the optic axis of the electro-optical means for rotating the polarization of the conically refracted light beam emitted by the birefringent means whereby the resolution of the conically refracted light beam is increased over that emitted by the birefringent means to provide a well-defined output light beam.

References Cited

UNITED STATES PATENTS

| | | | |
|---|---|---|---|
| 1,773,980 | 8/1930 | Farnsworth. | |
| 1,958,606 | 5/1934 | Birch-Field | 350—151 |
| 2,705,903 | 4/1955 | Marshall. | |
| 2,780,958 | 2/1957 | Wiley. | |
| 2,936,380 | 5/1960 | Anderson. | |
| 3,106,881 | 10/1963 | Kapur | 88—61 |

JEWELL H. PEDERSEN, *Primary Examiner.*

RONALD L. WIBERT, *Examiner.*